US008757461B2

(12) United States Patent
Zanetti

(10) Patent No.: US 8,757,461 B2
(45) Date of Patent: Jun. 24, 2014

(54) DEVICE FOR THE SUPPORT OF PORTABLE ELECTRONIC EQUIPMENT WITH ANCHORAGE DEVICE PROVIDED WITH A MAGNETIC SUPPORT

(75) Inventor: Paolo Zanetti, Conegliano (IT)

(73) Assignee: Walmec SpA, Milan (IT)

( * ) Notice: Subject to any disclaimer, the term of this patent is extended or adjusted under 35 U.S.C. 154(b) by 741 days.

(21) Appl. No.: 12/996,223

(22) PCT Filed: Jun. 4, 2009

(86) PCT No.: PCT/IB2009/005870
§ 371 (c)(1),
(2), (4) Date: Feb. 16, 2011

(87) PCT Pub. No.: WO2009/147514
PCT Pub. Date: Dec. 10, 2009

(65) Prior Publication Data
US 2011/0163143 A1    Jul. 7, 2011

(30) Foreign Application Priority Data
Jun. 6, 2008   (IT) ............................... TV2008A0083

(51) Int. Cl.
*B60R 7/06*      (2006.01)
*A47G 1/17*      (2006.01)

(52) U.S. Cl.
USPC ........................... 224/562; 224/483; 224/929

(58) Field of Classification Search
USPC .................... 224/183, 483, 562, 929; 24/303;
248/683, 309.4, 222.14, 229.13,
248/655–656; 403/343, 350, 374.1–374.3
See application file for complete search history.

(56) References Cited

U.S. PATENT DOCUMENTS

| 4,702,447 | A | 10/1987 | Westwood, III |
| 5,096,150 | A | 3/1992 | Westwood |
| 5,611,120 | A * | 3/1997 | Riceman et al. ................ 24/303 |
| 6,305,656 | B1 * | 10/2001 | Wemyss .................... 248/309.4 |
| 6,888,940 | B1 | 5/2005 | Deppen |
| 8,360,378 | B1 * | 1/2013 | Owens ....................... 248/309.4 |

FOREIGN PATENT DOCUMENTS

| GB | 367529 A | 2/1932 |
| WO | 0002362 A1 | 1/2000 |
| WO | 0049919 A1 | 8/2000 |

* cited by examiner

*Primary Examiner* — Brian D Nash
*Assistant Examiner* — John Cogill
(74) *Attorney, Agent, or Firm* — Egbert Law Offices, PLLC

(57) ABSTRACT

Connection device of a portable electronic equipment with anchorage device provided with a magnetic support, particularly in the car driver and passenger compartment having ventilation air vents of the type provided with fins. The magnetic base has an attraction seat to house the coupling interface of the coupling plate with the coplanar approaching at least two permanent magnets reciprocally attracted one another, axially magnetized with inverted polarity. The magnetic base joined to the anchorage device has an attraction seat with a concave configuration with spherical cap section. The anchorage device is a clamp including two movable jaws, reciprocally articulated one another at a first end, with a cam-shaped surface relatively to the base of the first end, which insists in correspondence of an adjustment locknut, with respect to which a screw passes through coaxially. The magnetic base with attraction seat is associated with the locknut.

11 Claims, 4 Drawing Sheets

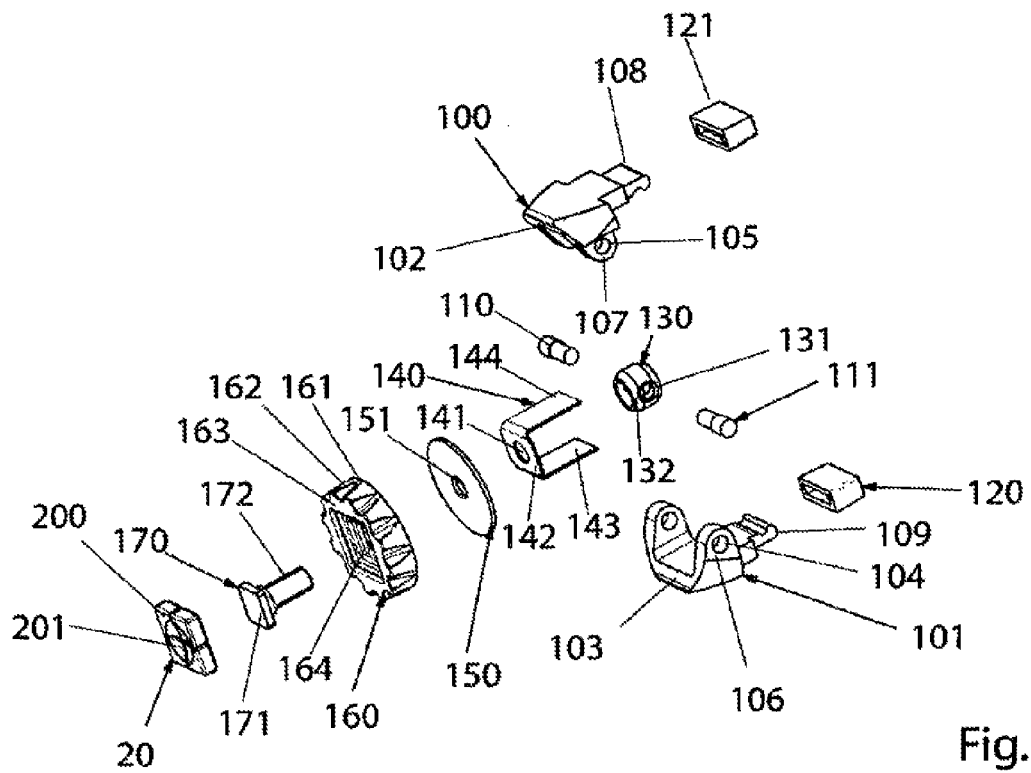
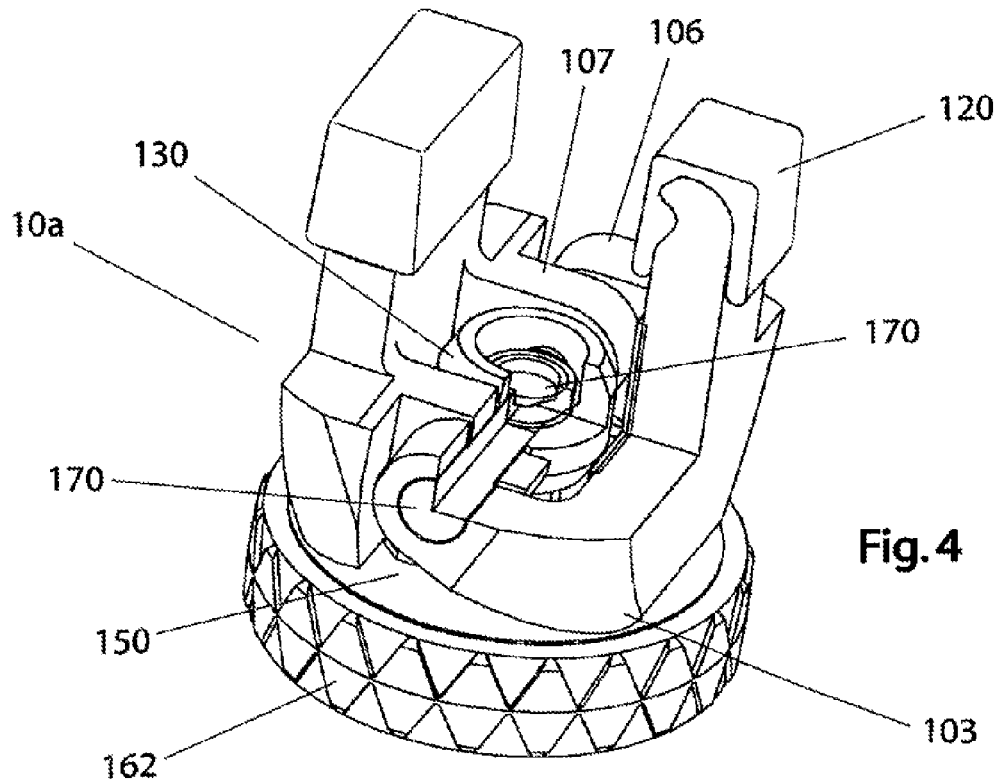

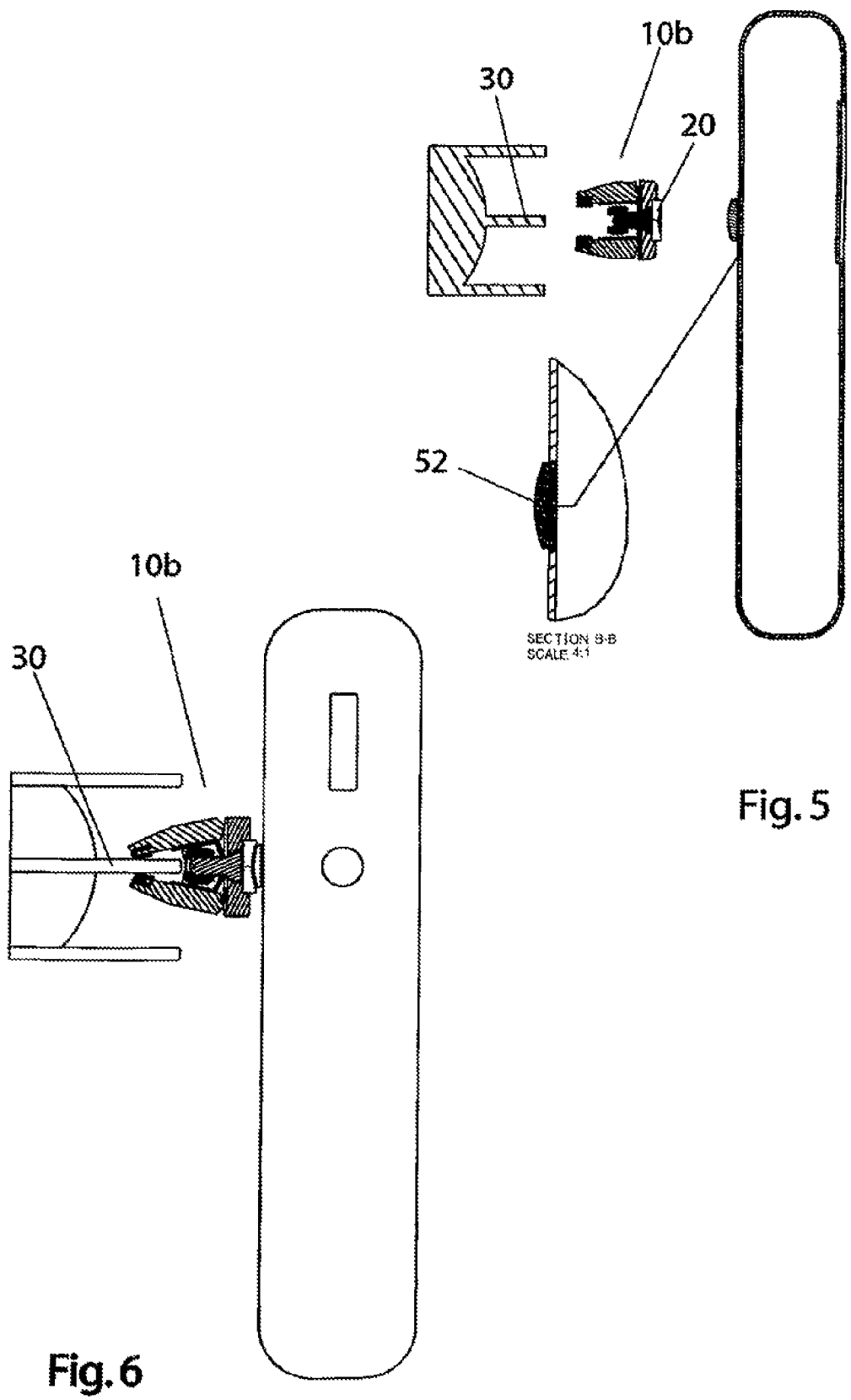

DEVICE FOR THE SUPPORT OF PORTABLE ELECTRONIC EQUIPMENT WITH ANCHORAGE DEVICE PROVIDED WITH A MAGNETIC SUPPORT

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

This invention relates to a connection device of portable electronic equipment with anchorage device provided with a magnetic support, particularly for car driver and passenger compartments having ventilation air vents with fins.

2. Description of Related Art Including Information Disclosed Under 37 CFR 1.97 and 37 CFR 1.98.

Domain

It is known that there is the need to make the compartment comfortable, according to a capillary and as much uniform as possible distribution of the air flows which are then introduced in the car compartment from the external environment or even transiting through air conditioning or climatization systems located in proper compartments, as main flow source means. This distribution usually occurs through some air vents, which, being located in certain points of the car compartment, allow the localized diffusion of the corresponding secondary airflow. Said air vents, which are mainly located in the dashboard, centrally and more or less above the tunnel of the gear group, located in to the side of the steering wheel of the driver for the driver side, while located near the window for the passenger, are all located at the end of an articulated channeling which provides the secondary flow distribution drawing air from the main flow coming from said flow source means. In many others cases, some air vents are also located so as to involve the rear compartments, mainly located at the rear end of the central tunnel, but also under the seats, and in general in a position where they can be easily adjusted.

The conventional air vents consist of a protruding cover peripherally joined with the relative neck, at the internal surface of the car compartment and connected at its end to the relative ventilation duct on the rear side. Said cover is provided with a series of parallel and equidistant fins, rectangularly shaped in a plan view, with the ends hinged in an intermediate position along the two opposite inwardly-directed walls of the relative cover. Along the rear border of each fin, a seat is present for the engagement of a connecting vertical rod, which contextually engages all the fins. At the front side of the cover, at least one of the fins is provided with an appendix, so that, handling it and performing a movement along a vertical axis, it is possible to progressively change the incidence angle of the fins with respect to the flow, until, going on with the movement, most of the flow exit channel is occluded, the fins resulting transversely placed and partially overlapped.

The mobile phone, as well as the navigator, is well-known, and even small electronic processors. It is a kind of portable equipment which is widely used, by now every day, and follows the user almost in all circumstances. When one is driving a motor vehicle, single regulations impose, at least in some countries, the use of such equipment in safety conditions, we will say with the universal term hand free, that is to say with free hands. According to this, for said requirements to subsist, the portable equipment should preferably be safely fastened to a support that, in principle, is firmly or temporarily fixed inside the driver and passenger compartment of the motor vehicle in a position as close to the driver as possible, e.g. the dashboard or the gear tunnel, in order to be easily accessible without causing particular distractions.

State of the Art

There are various kinds of supports for portable electronic equipment, if not originally provided by the car manufacturer. Traditionally, the most widespread originate from devices having, on the anchorage base, a sucker, which is operated by a lever that cooperates with a cam, and obtains a depression sufficient to hold the base of the sucker in the desired position. From the sucker base originates the support arm, at the end of which different means for holding the electronic equipment can be included, e.g. screw clamps, Velcro strips and others. Further empirical supports are usually created directly by the user, for example with the use of double- sided adhesive tapes or of Velcro, in order to secure, for example on the dashboard, a first layer of material to which the electronic equipment is fastened.

Permanent magnets are equally well-known. Widely used in the car industry as well, they are employed to fix, in a removable way, various equipment and accessories, mostly external to the driver and passenger compartment. The magnets are attracted or repelled by various materials; a material strongly attracted by a magnet has a high magnetic permeability, e.g. iron and steel that are thus defined as ferromagnetic. There can be different magnets, for example Neodymium or ND magnets are the best since they behave well according to temperatures.

In some cases permanent magnets were used also inside the driver and passenger compartment, always as support means. One will remember, for example, when the dashboards of the driver and passenger compartment in a motor vehicle, instead of being made of plastic material, as they are now, were mostly made of metallic material, actually of common shaped metal plate. Being of ferromagnetic material, some accessories, above all gadgets and religious icons, had a magnetic tape on their back, mainly with the adhesive coupling interface, and shaped according to a square or even round geometric form. In this way, the gadget itself, attracted to the back because of the magnet, could be applied in the desired position.

In patent literature, there are some significant examples of application of a magnet for the support of equipment and accessories. SE512358 (Gustavsson), for example, describes a shielded magnetic mobile phone stand, fixable to the computer, monitor or television, including a steel container that circumscribes multipolar magnets. The container of magnets is fixed to the computer, by means of glue or of double-sided adhesive tape.

Closer to the invention, instead, is KR200a10012021 (Ahn), in which a neodymium magnetic mobile phone stand, with a three-pole section is described. A magnetic mobile phone stand is intended to fix a mobile phone without damaging the vehicle and can be easily held with respect to knocks and children. It consists of an elastic surface of a sponge or rubber body meant to be fixed to a curved part. A highly elastic front plate is adherent to the front side of the elastic surface by means of an adhesive agent such as latex. An aromatic compound is contained in the elastic surface and a hollow is formed in the centre to hold the magnet. A small bar containing iron is stuck to the mobile phone battery. A double-sided adhesive tape is added to the front face of the iron plate to attract the magnet. The used magnet has an upward or downward connection capacity or a three-pole section neodymium magnet, instead of a two-pole section magnet. The magnet with a three-pole magnetic field, has a broad magnetic field close to the pole because it has a uniform magnetic distribution. It does not affect inner electronic components.

U.S. Pat. No. 6,888,940 (Deppen). Describes a magnetic stand for mobile telephones. It consists of a cup made of ferromagnetic material, inside of which a magnet is supported. The back part of the cup contains double-sided adhesive tape in order to provide the fastening of the cup to the surface of the vehicle dashboard. The cup concentrates the magnet force along the front edge. A friction ring circumscribes the front edges of the cup and provides an effective holding of the mobile phone fixed to the cup by means of the magnetic attraction between the inner magnet and the battery of the mobile phone or other metallic parts.

In WO0049919 (Wemy) a magnetic coupling for various accessories and equipment is described. On the dashboard of a motor vehicle, by means of adhesive materials, a base is positioned made up of a magnet covered with rubber or neoprene, shaped in such a way as to peripherally produce a rounded surface. Various accessories with support aims can be connected to the base, providing a counter-shaped seat on the base made of ferromagnetic material.

Closest State of the Art to the Object of the Invention

DI: ITTV2007A000182 (Zanetti)

D2: WO2008/042690 (Brown)

D3: JP101 26474 (Miyanaka)

In DI a magnetic connecting device is proposed for the support, particularly in cars, of a portable electronic equipment, comprising a base which integrates at least two side-by-side magnets, said magnetic connecting device being fixable in correspondence with an internal surface of the driver and passenger compartment, and a coupling plate including a ferromagnetic material which is fixable or integrated on the back of the equipment to be supported or in correspondence of the intermediate accessory arranged to support the equipment, in which the base, which is provided at a first side with an adhesive material layer adhering to the surface of the driver and passenger compartment, consists of the coplanar coupling of at least two reciprocally attracted permanent magnets, each magnet having a geometric design with a polygonal plant. The plate for the coupling to the base, which comprises at least one portion obtained by a ferromagnetic material, is of the type with the equipment coupling interface provided with a biadhesive material layer, while the face attracted by the base magnetic field has a dimension sufficient to self-centre on the magnets to which it must anchor, by means of the arrangement of the magnetic fields to which it is submitted.

In D2 a universal accessory to support the mobile phone headset is described, which comprises a "U" shaped receiver element for the support of the headset. The receiver element is joined, possibly in a removable way, to a connection device which is shaped as a clip in order to be fixed to a fin of an air vent grid of the driver and passenger compartment; the clip consisting of two elastically yielding articulations in order to confer an efficient retaining capacity to the clip.

In D3 a portable phone support is described. In this case, there is a bracket anchoring to the air vent fins, said bracket supporting a receiver element of the phone; the receiver element is provided on the sides with two elastically yielding jaws which hold the portable phone in a removable position, sideways embracing its borders.

From everything stated above, it is therefore reasonable to consider as known: a) The use of at least one magnet for the easily removable support of an electronic equipment or of a support accessory, e.g. a mobile phone, inside the driver and passenger compartment of a motor vehicle and in particular on the dashboard; b) The magnet or the magnets according to the destination a) of multipolar kind that is to say with the three-pole geometry of the magnetic field with a central nucleus and two side poles; c) At least two side-by-side magnets, of the type with inverted polarity integrated in a base with a circular geometric shape and intended to be coupled inside a counter-shaped female seat obtained in correspondence of the electronic equipment or in correspondence of the supporting accessory to be fixed; d) A connection device for the support of electronic equipment accessories, whose anchorage device consists of an elastically yielding clip, for the support of the phone headset, which anchorage device is fixed to the air vent fins of a driver and passenger compartment; e) An adjustable connection device to support of the mobile phone fixed in correspondence of the air vents inside a driver and passenger compartment.

Drawbacks

The above described solutions relative to the most relevant state of the art have, according to the applicant, some drawbacks. In particular, in DI the support integrating the magnet is not fixable in an adequate and coherent way to the dashboard of the motor vehicle. There is therefore an objective risk in the retaining of the electronic equipment because in the course of time the support, above all in consideration of the variable climatic conditions, can reasonably lose its adhesive capacity making the anchorage fail with the contextual fall of the equipment in the driver and passenger compartment. In DI the possible fall of the equipment is also due to the particular shape, at the base, of the retaining lowered seat integrating the side-by-side magnets and to the consequent shape of the counter-shaped coupling plate made of ferromagnetic material, which is joined to the equipment. This shape, substantially with a quadrilateral plant, seem not to ensure a sufficient holding degree between the components, causing the possible exit of the coupling plate from its seat, also and due to the continuous stresses to which the vehicle is subject during the driving which inevitably have an effect inside the driver and passenger compartment. Always the particular shape of the seat in the base, does not allow an easy and fast approaching of the electronic equipment, and furthermore it seems not to not allow the orientation of the equipment when it is in the supported condition.

D2 suggests a supporting device for phone headset or auriculars, which due to the light weight, has a connection to the air vent fin non suitable to support different loads as the conventionally greater weight of a mobile phone, because the used clip embracing the fin uses for the retention only its elastic capacity, and therefore it seems not to ensure a lasting good anchorage capacity, having a fall risk.

D3 suggests a complex and cumbersome solution, of a conventional type, which moreover requires laborious operations intended to fix in a stable way the supporting device to the air vent, and presents reasonable difficulties in taking and positioning the mobile phone. In the less relevant solution described in SE51 2358 (Gustavsson) it can be observed that the magnets are not in direct contact with the accessory, but exploit a perimetrical container constituting an induced attraction surface, that could alter the effectiveness of the magnet action with consequent accidental detachment of the equipment. Other solutions with multipolar magnets, seems to be effectively suitable for a good fastening of the accessory or of the equipment, however, consisting of a magnet of monolithic construction, it needs a sufficient flat space and significant sizes which today are difficult to be found in the conventional internal design of cars.

Finally, in relation to W00049919 (Wemy) it was observed that it combines the action of the magnet, which is fixed on the dashboard of the motor vehicle, with a housing seat obtained in the device or in correspondence of its intermediate supporting accessory, a solution that supposedly could improve the retaining effectiveness. However, it seems reasonable to suppose that the use of a conventional monolithic magnet, does not confer a good retaining capacity of the accessory at all, this considering also that sometimes the equipments can have a certain weight, this requiring a correct proportional increase of the size of the magnet. The latter disadvantage, which is moreover easily referable also to other above mentioned solutions, involves the need to have wide and sufficiently flat surfaces at one's disposal in order to allow the effective adhesion of the adhesive to which the magnet system is fixed. Both the aesthetic and technological evolution in vehicle fabrication is leading de facto to the lack of surfaces with such characteristics, only small spaces being available more and more often obtained with curved surfaces.

In conclusion, the devices provided by known technology, due to their size, determine not only an increase in the production costs of the support device, but also negatively affect the aesthetic profile, making the installation of the device inside the driver and passenger compartment not very agreeable to the user, as very visible, besides significantly increasing the weight and size of the cellular equipment, when needing to apply either a ferromagnetic part or the magnet on the device. Considering all this, companies need to find innovative solutions which can overcome at least the above mentioned problems.

BRIEF SUMMARY OF THE INVENTION

These and other goals are achieved by the present innovation according to the features described in the annexed claims, solving the expounded problems by means of a connection device of portable electronic equipment with anchorage device provided with a magnetic support, particularly for car driver and passenger compartments having ventilation air vents of the type provided with fins, comprising:

a magnetic support for portable electronic equipment with a magnetic base having at least two side-by-side magnets, which is fixable in correspondence of an internal surface of the driver and passenger compartment, and of a coupling plate including a ferromagnetic material which is fixable or integrated on the back of the equipment to be supported or in correspondence of the intermediate accessory arranged to support the equipment;

wherein, the magnetic having an attraction seat to receive the coupling interface of the coupling plate, has the coplanar approaching of at least two permanent magnets reciprocally attracted to one another, axially magnetized—inverted polarity;

wherein, the coupling plate comprises at the magnetic base at least one protruding portion of the coupling interface made of a ferromagnetic material; in which, the magnetic base joined to the anchorage device has an attraction seat with a concave configuration with spherical cap section; and furthermore in which the anchorage device is a clamp including two movable jaws, reciprocally articulated one another at a first end, with a cam-shaped surface relatively to the base of the first end, which insists in correspondence of an adjustment locknut, with respect to which a screw passes through coaxially; said magnetic base with attraction seat is associated to the locknut.

Objectives

In this way, through the considerable creative contribution whose effect represents an immediate and significant technical improvement, diverse and important objectives are achieved.

A first objective was to obtain a connection device with an anchorage device, particularly effective in the engaging in a stable way the magnetic support to the ventilation air vents of the car driver and passenger compartment. This precludes the accidental detachment, ensuring in a permanent way and independently from the climatic conditions the supporting function of the portable electronic equipment even in abrupt driving conditions or in relation to particular stresses during driving.

A second aim was to make the fixing or the removal of the anchorage device provided with the magnetic base extremely easy, as well as to make the adjustment of the clamping intensity of the jaws particularly easy depending on the need. For example, as it can occur in the case in which an intrinsic loosening occurs due to the vehicle speed and in general to the stresses which usually are transmitted to the driver and passenger compartment over time.

A third aim consists in the fact that due to the effective grip of the jaws, whose ends elastically operate with a good clamping capacity, the retaining function of the anchorage device is further improved, even in the presence of particularly rigid climatic conditions or in the presence of high temperatures.

A fourth achieved objective is in relation with the particular shape of the attraction seat obtained in the magnetic base, which consisting of a spherical cap shape helps the approaching of the counter-shaped coupling plate provided on the electronic equipment, and its contextual adjustment of the orientation according to more than one axis. The connection and detachment action of the equipment from the support is moreover promoted, in a self-centering way in the same way, and in a still much more precise way than the one usually obtainable from the use of the solution described in D1. With the side-by-side magnets, wherein the symmetry centre and the concentration of the magnetic flux lines in the perimeter of the magnets constituting the system coincides with the centre of the total attraction surface of the base, the hand of the user is further driven by the multipolar magnetic field, and induced to correctly position the insert or the coupling plate which is joined to the equipment.

The combination of DI with D2 is not apparent to a technician skilled in the art, because the two needs to be satisfied and the aims are significantly different from each other. In fact in DI there is the need to support the electronic equipment by means of an adhesive support to the dashboard of the vehicle, while in D2 there is a specified location, the ventilation air vent, while the support is intended to retain auricular headsets only. Moreover it must be said that the configuration of the anchorage clip, which cannot be adjusted in its adjusting intensity, is not structured to support loads comparable to the weight of conventional electronic equipment and it would not be sufficient to change sizes or details of the same to obtain a result equivalent to the one object of the present invention.

One more aim was to provide an anchorage device, which allows to fix the magnetic support in areas substantially free from any obstacle, as those of the ventilation air vents, easily accessible by the user at the same time ensuring the keeping of a good concentration and with a good chance to perform adjustments due to the spherical cap shape of the attraction seat. One more objective was to reduce the aesthetic impact, limiting altogether the costs of production and of stock management of the product.

In conclusion, the significant value of these advantages is to achieve a good technological content.

These and other advantages will emerge from the following detailed description of some preferred embodiments with the aid of the enclosed schematic drawings, whose execution details are not to be considered as limitative but only and exclusively as illustrative.

BRIEF DESCRIPTION OF THE SEVERAL VIEWS OF THE DRAWINGS

FIG. 3 is an exploded view of the anchorage device only as for the previous figures.

FIG. 4 is a three-dimensional section plane view of the anchorage device as for the previous figures.

FIG. 5 is an assembly sectional view of one alternative embodiment of the connection device, whose anchorage device with the magnetic support is in a condition in which it is going to be joined to the ventilation air vent for the connection of the electronic equipment.

FIG. 6 is an assembly side-view of the connection device in an installed condition with the anchorage device of FIG. 5, fixed to the ventilation air vent, to which the electronic equipment is joined.

Finally.

DETAILED DESCRIPTION OF THE INVENTION

Practical Execution of the Invention

Figures 1, 2:
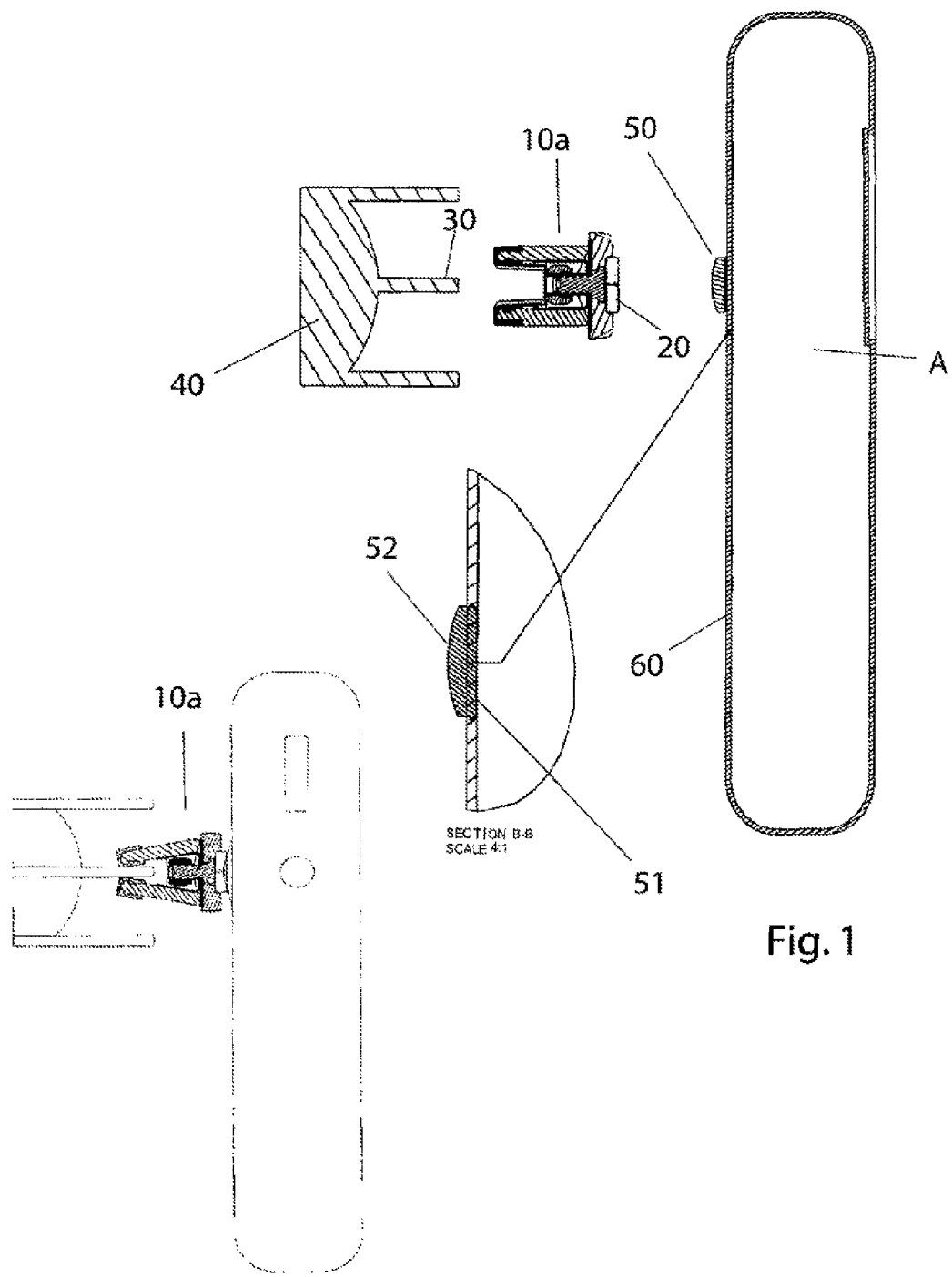
FIG. 1 is an assembly sectional view of the connection device with the relative anchorage device provided with a magnetic support, to be joined to the ventilation air vent for the connection of the electronic equipment.
FIG. 2 is an assembly side-view of the connection device in an installed condition, or with the anchorage device fixed to the ventilation air vent, to which the electronic equipment is joined by means of the coupling plate as for FIG. 1.
Figure 7:
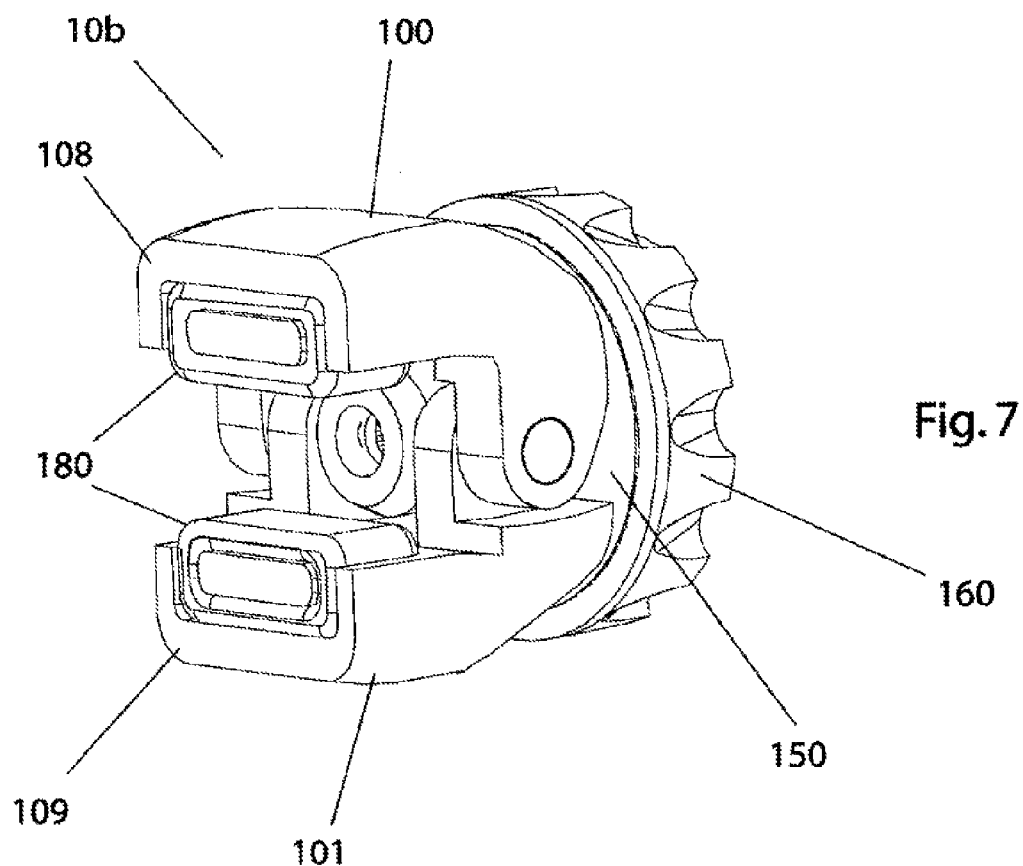
FIG. 7 is a three-dimensional view of the anchorage device only as for FIGS. 5 and 6.

The present innovation, refers to a connection device (10a, 10b), (20), (50) which includes the anchorage device (10a, 10b) (FIGS. 4, 7) with supporting magnetic base (20), particularly to fix in a removable way a portable electronic equipment (A) (FIGS. 1, 5), inside the vehicle driver and passenger compartment and particularly in correspondence of the fins (30) of a ventilation air vent (40) (FIGS. 2, 6). In one case the portable electronic equipment (A) is of the type provided with a coupling plate (50), which is partially integrated on the back (60) of the portable equipment (A).

Figure 8:
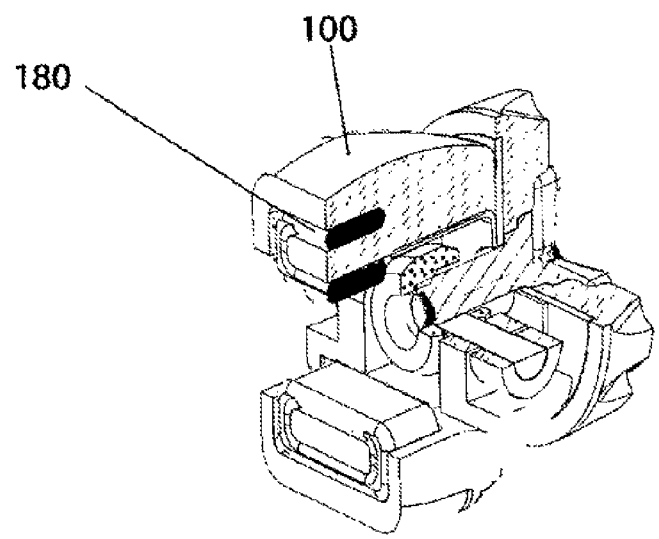
FIG. 8 is a three-dimensional section plane view of the anchorage device only as for FIG. 7.

The clamp shaped anchorage device (10a, 10b) (FIG. 4, 7), essentially has two specular movable jaws (100, 101) (FIG. 3), with a first end (102, 103) articulated among them by means of pins (110, 111). The pins (110, 111) are housed within corresponding hinging holes (104, 105) obtained at the ends of the two forks (106, 107), of which one within the other to embrace a spherical toggle articulation (130) and at the sides of which diametrically opposite holes (131) are obtained intended to hinge the ends of the pins (110, 111) which constrain the forks (106, 107) of the movable jaws (100, 101) with one another. The two pins (110, 111) forming the elements on which the jaws (100, 101) rotate to obtain the holding function on the fin (30) don't unthread due to the effect of the constructive interference with the diameter of the portion of the spherical toggle articulation (130) which is centrally threaded (132), in which they are housed in the radially obtained holes (131). Each of the second ends (108, 109) of the two movable jaws (100, 101) in the anchorage device (10a) are coated with a high friction elastoplastic material sheath (120, 121) (FIG. 4) for example some natural latex rubber. In the solution of FIG. 8, the anchorage device (10b) is conceived in such a way that the second ends (108, 109) of the movable jaws (100, 101) have a seat inside which a ring (180) (FIG. 8) can be inserted which surrounds part of the end (108, 109) of the corresponding jaw (100, 101), remaining partly covered by the shape of the jaw (100, 101) itself. In principle, the movable jaws (100, 101) are made of die-cast zinc alloy with galvanic treatment, alternatively they can be made of a thermoplastic material, as polycarbonate with fluorescent pigments in order to allow its localization also in dark conditions, facilitating the positioning of the portable electronic equipment (A).

A spring (140) is "U" shaped with a hole (141) in correspondence of the base (142) at the sides of which the walls (143, 144) are located, whose external side oppositely leans against the inside wall of the jaws (100, 101).

A washer (150) with a central hole (151), coincident with respect to the hole (141) of the spring (140) is interposed between the base (142) of the spring (140) and the flat surface (161) of the locknut (160). In one case, the washer (150) is housed within a corresponding seat obtained in correspondence of the flat surface (161) of the locknut (160).

The locknut (160) (FIG. 4) is provided with a first side with the flat surface (161) peripherally surrounded by a knurled grip wall (162), and with a second side (163) inside which a seat (164) is obtained to house the squarehead (171) of a screw (170), the threaded portion (172) of said screw (170) passing through the locknut (160), the washer (150), the spring (140) in order to than engage the spherical toggle articulation (130) through the hole (132). The squarehead (171) of the screw (170) being a key, remains in an engaged condition with respect to the locknut (160), inside the seat (164) which is counter-shaped, and in a substantially recessed position, in such a way as to leave a residue space able to contain, integral with the locknut (160) against the head (171), the magnetic base (20) a part of which protrudes with respect to the locknut (160).

The magnetic base (20) cooperates with a coupling plate (50) (FIG. 3) joined to the portable equipment (A) and that in this way is attracted by the magnetic base (20). Still, the magnetic base (20) is obtained approaching among them at least two magnets (200) wherein each of them is axially magnetized-inverted polarity, in the exemplary embodiment being obtained joining four symmetrical magnets (200) made of ND (neodymium) with a magnetizing degree at least corresponding to N48. Each magnet (200) has a substantially parallelepiped shape with a geometrical configuration which is square in a plant view and with a shaped coupling interface, in such a way that the magnets (200), joined the one to the other in order to form the magnetic base (20), configure the attraction seat (201) which has a concave shape with spherical cap section. Each neodymium magnet (200) can be gold coated, obtaining a high protection from oxidation and corrosion with very low thicknesses. This in order to obtain the maximum magnetic efficiency as possible which is inversely proportional with an exponential relation with respect to the distance of the magnets (200) surface with respect to the surface of the ferromagnetic coupling plate (50).

The electronic apparatus (A), e.g. a mobile phone, is of the type provided with a coupling plate (50) in correspondence of the back (60). The coupling plate (50) is a monolithic body made of a ferromagnetic material, with a base portion (51) which is integrated in the back (60) of the equipment (A), and a protruding portion which constitutes the coupling interface (52) which is raised with respect to the surface of the back (60), whose shape is counter-shaped, in this it is case convex, with respect to the concave attraction seat (201) of the supporting magnetic base (20).

In a different version, the coupling plate (50) includes a shell like cover, made of a plastic material which is of the overinjected type with respect to the insert, centrally placed, which is made of a ferromagnetic material. The insert protrudes with respect to the external face of the cover with a configuration, which is counter-shaped with respect to the attraction seat (201) of the magnetic base (20). Concerning the shape of the cover, from the internal side it is provided with a retaining zone, having a peripheral tooth, which prevents the extraction of the insert made of a ferromagnetic material. Furthermore, it is observed that, in correspondence of the face connecting to the electronic equipment (A), the cover is provided with a housing, inside which a biadhesive material layer is housed whose thickness is greater than the depth of the housing in such a way to protrude. The adhesive interface firmly joins the biadhesive material layer to the cover which holds the insert, while the external face, provided with a removable anti-sticking film, is intended to favor the anchorage of the coupling plate to the object to be supported, being able to adapt in an optimal way to the shape of the surface.

I claim:

1. A connection apparatus for portable electronic device, the connection apparatus comprising:
    a magnetic support having a magnetic base, said magnetic base having at least two permanent magnets arranged in side-by-side relationship, said magnetic support suitable for fixing to an internal surface of a vehicle, said magnetic support having a coupling plate having a ferromagnetic material, said coupling plate having a counter-shaped coupling interface, said coupling plate suitable for fixing to a back of the portable electronic device, said magnetic base having an attraction seat receiving said counter-shaped coupling interface, said attraction seat comprising an approaching of the permanent magnets in which the permanent magnets are reciprocally attached to each other with each magnet being axially magnetized with inverted polarity, said coupling plate receiving at least one protruding portion of said coupling surface;
    an anchoring device having a pair of movable jaws articulated to each other at a first end thereof, each of said pair of movable jaws having a cam-shaped surface at the first end thereof, said anchoring device having an adjustment locknut affixed to a screw that passes between said pair of movable jaws, said pair of movable jaws of said anchoring device having second ends each having a seat that receives a ring, the ring surrounding a portion of the second end of the respective movable jaw of said pair of movable jaws, the ring being partially covered by the movable jaw.

2. The connection apparatus of claim 1, each of said pair of movable jaws formed a thermoplastic material having a fluorescent pigments.

3. The connection apparatus of claim 1, said coupling plate having a shell-shaped cover and a centrally-positioned insert, said insert formed of a ferromagnetic material, said insert protruding with respect to an external face of said cover and having a configuration that is counter-shaped with respect to said attraction set, said cover having a housing with a biadhesive material layer inside thereof, said housing positioned at a face of said cover facing the portable electronic device.

4. The connection apparatus of claim 1, said anchoring device suitable for fixing to a fin of a ventilation air vent of the vehicle.

5. A connection apparatus for portable electronic device, the connection apparatus comprising:
    a magnetic support having a magnetic base, said magnetic base having at least two permanent magnets arranged in side-by-side relationship, said magnetic support suitable for fixing to an internal surface of a vehicle, said magnetic support having a coupling plate having a ferromagnetic material, said coupling plate having a counter-shaped coupling interface, said coupling plate suitable for fixing to a back of the portable electronic device, said magnetic base having an attraction seat receiving said counter-shaped coupling interface, said attraction seat comprising an approaching of the permanent magnets in which the permanent magnets are reciprocally attached to each other with each magnet being axially magnetized with inverted polarity, said coupling plate receiving at least one protruding portion of said coupling surface;
    an anchoring device having a pair of movable jaws articulated to each other at a first end thereof, each of said pair of movable jaws having a cam-shaped surface at the first end thereof, said anchoring device having an adjustment locknut affixed to a screw that passes between said pair of movable jaws; and
    a U-shaped spring having a hole formed therein, said spring having sides bearing against an inside wall of said pair of movable jaws, said hole formed in a base between said sides, said screw extending through said hole.

6. The connection apparatus of claim 5, further comprising:
    a washer positioned between the first end of said pair of movable jaws and said adjustment locknut, said screw passing through a central hole in said washer.

7. A connection apparatus for portable electronic device, the connection apparatus comprising:
    a magnetic support having a magnetic base, said magnetic base having at least two permanent magnets arranged in side-by-side relationship, said magnetic support suitable for fixing to an internal surface of a vehicle, said magnetic support having a coupling plate having a ferromagnetic material, said coupling plate having a counter-shaped coupling interface, said coupling plate suitable for fixing to a back of the portable electronic device, said magnetic base having an attraction seat receiving said counter-shaped coupling interface, said attraction seat comprising an approaching of the permanent magnets in which the permanent magnets are reciprocally attached to each other with each magnet being axially magnetized with inverted polarity, said coupling plate receiving at least one protruding portion of said coupling surface;
    an anchoring device having a pair of movable jaws articulated to each other at a first end thereof, each of said pair of movable jaws having a cam-shaped surface at the first end thereof, said anchoring device having an adjustment locknut affixed to a screw that passes between said pair of movable jaws, said pair of movable jaws having a pair of pins extending into hinging holes formed in correspondence at the first ends of said pair of movable jaws, the connection apparatus further comprising:

a toggle articulation having at least one hole formed therein, said pair of pins having ends received in the hole of said toggle articulation, said toggle being threadedly secured by a screw.

8. The connection apparatus of claim 5, said adjustment locknut having a first side with a flat surface, said flat surface peripherally surrounded by a knurled grip wall, said adjustment locknut having a second side with a seat therein, said screw having a square head, said square head housed within said seat, said screw having a threaded portion passing through said adjustment locknut in order to engage the hole of said toggle apparatus.

9. The connection apparatus of claim 8, said square head of said screw having a key engaged with respect to said adjustment locknut, said seat being counter-shaped so as to contain a portion of said magnetic base, said magnetic base protruding outwardly of said seat.

10. The connection apparatus of claim 7, said attraction seat having a concave shape, said coupling plate being a monolithic body of ferromagnetic material, said coupling plate having a base portion suitable for integration with a back of the portable electronic device, said coupling interface having a protruding portion which is raised relative to the back of the portable electronic device, said protruding portion being of a convex shape so as to mate with said concave shape of said attraction set.

11. The connection apparatus of claim 7, said pair of movable jaws of said anchoring device having second ends that are coated with a high friction elastoplastic sheath.

\* \* \* \* \*